United States Patent
Kobayashi et al.

(10) Patent No.: US 10,308,112 B2
(45) Date of Patent: Jun. 4, 2019

(54) SADDLE TYPE FUEL TANK

(71) Applicant: HONDA MOTOR CO., LTD., Tokyo (JP)

(72) Inventors: Kazuhiro Kobayashi, Wako (JP); Tomoyuki Suuchi, Wako (JP); Takeharu Yoshihashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/832,847

(22) Filed: Dec. 6, 2017

(65) Prior Publication Data
US 2018/0162220 A1    Jun. 14, 2018

(30) Foreign Application Priority Data

Dec. 8, 2016 (JP) ................ 2016-238853

(51) Int. Cl.
| | |
|---|---|
| *B60K 15/00* | (2006.01) |
| *B60K 15/073* | (2006.01) |
| *B60K 15/03* | (2006.01) |
| *B60K 15/035* | (2006.01) |
| *F02M 37/00* | (2006.01) |
| *B60K 15/04* | (2006.01) |

(52) U.S. Cl.
CPC ............ *B60K 15/073* (2013.01); *B60K 15/03* (2013.01); *B60K 15/035* (2013.01); *F02M 37/00* (2013.01); *B60K 2015/03131* (2013.01); *B60K 2015/03144* (2013.01); *B60K 2015/03289* (2013.01); *B60K 2015/03296* (2013.01); *B60K 2015/03576* (2013.01); *B60K 2015/0467* (2013.01)

(58) Field of Classification Search
CPC .... B60K 15/073; B60K 15/03; B60K 15/035; B60K 15/077
See application file for complete search history.

(56) References Cited

U.S. PATENT DOCUMENTS

| | | | | |
|---|---|---|---|---|
| 4,703,771 A | * | 11/1987 | Mimura | ............... B60K 15/077 137/142 |
| 6,604,539 B1 | * | 8/2003 | Strohmayer | ......... B60K 15/035 137/202 |
| 6,941,966 B2 | * | 9/2005 | Mori | ................ B60K 15/03519 137/202 |

(Continued)

FOREIGN PATENT DOCUMENTS

JP    2002-002314 A    1/2002

*Primary Examiner* — Hau V Phan
(74) *Attorney, Agent, or Firm* — Rankin, Hill & Clark LLP

(57) ABSTRACT

Provided is a saddle type fuel tank in which liquid fuel does not reach a canister through an exhaust passage immediately after full-tank refueling. The saddle type fuel tank includes a saddle type tank body and a full-tank regulating valve. The full-tank regulating valve includes a valve body, a float valve, a first hanging pipe communicatively connected to the valve body and having a first opening at a hanging end thereof, and a second hanging pipe communicatively connected to the valve body and having a second opening at a hanging end thereof. The first opening of the first hanging pipe is located at a height corresponding to a full-tank liquid level RA1_full in the first chamber. The second opening of the second hanging pipe is located at a height lower than that corresponding to a full-tank liquid level RA2_full in the second chamber.

2 Claims, 6 Drawing Sheets

(56) References Cited

U.S. PATENT DOCUMENTS

| | | | | |
|---|---|---|---|---|
| 6,957,658 | B2* | 10/2005 | Aschoff | B60K 15/035 137/202 |
| 8,622,074 | B2* | 1/2014 | Hochstein | B60K 15/03519 137/202 |
| 8,826,123 | B2* | 9/2014 | Audet | G06F 17/241 715/200 |
| 8,910,675 | B2* | 12/2014 | Coulon | B60K 15/03519 137/199 |
| 2001/0054452 | A1 | 12/2001 | Ozaki | |
| 2002/0083974 | A1* | 7/2002 | Duermeier | B60K 15/03504 137/202 |
| 2007/0189906 | A1* | 8/2007 | Palvolgyi | B60K 15/077 417/36 |
| 2009/0065513 | A1* | 3/2009 | Kraemer | B60K 15/03519 220/600 |
| 2016/0167508 | A1* | 6/2016 | Jouie | B60K 15/03519 220/562 |

* cited by examiner

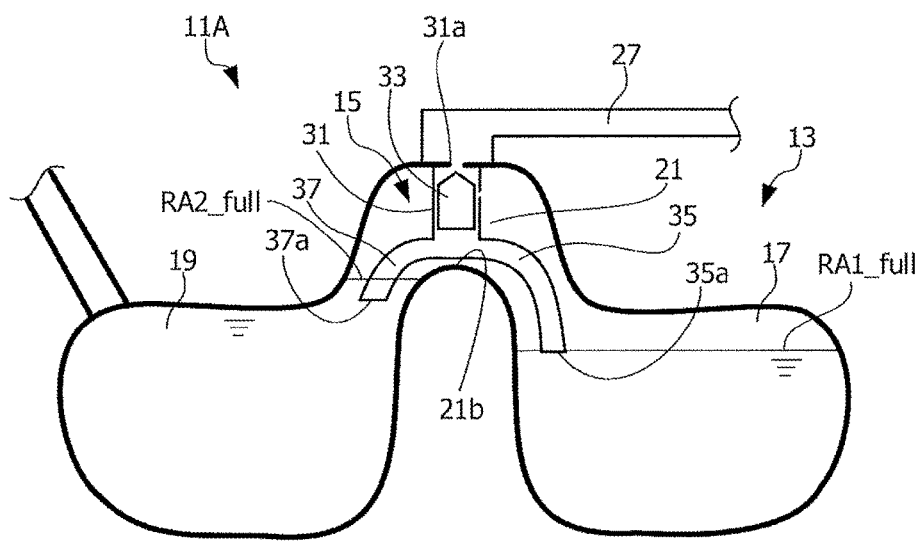
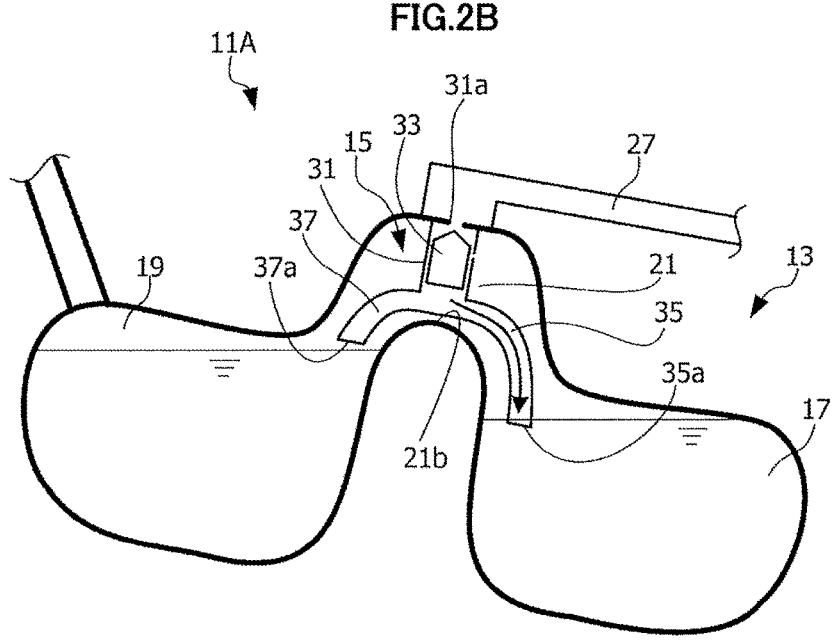

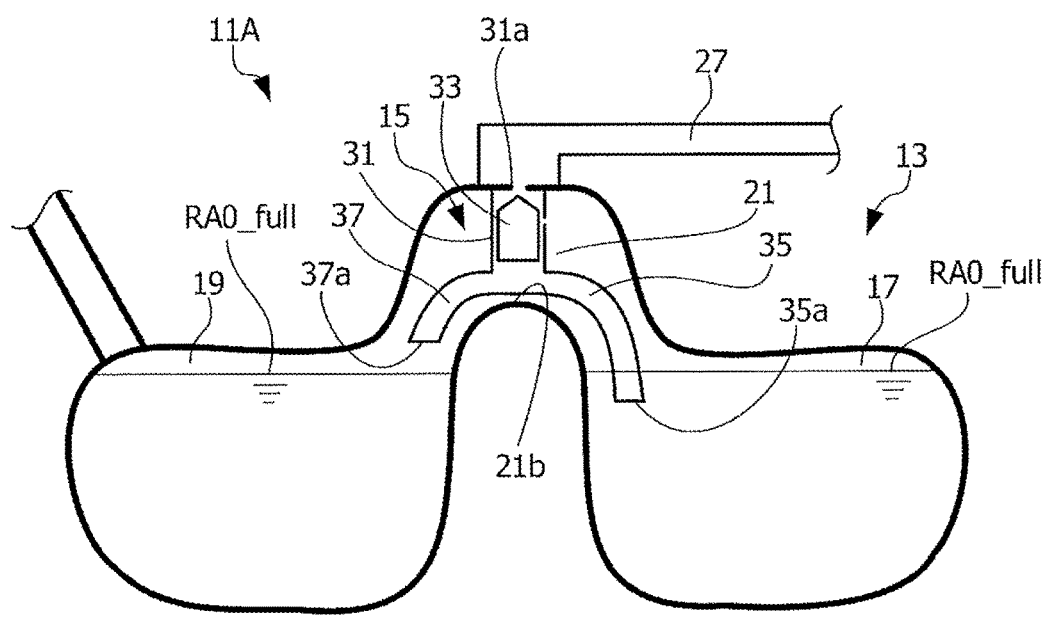

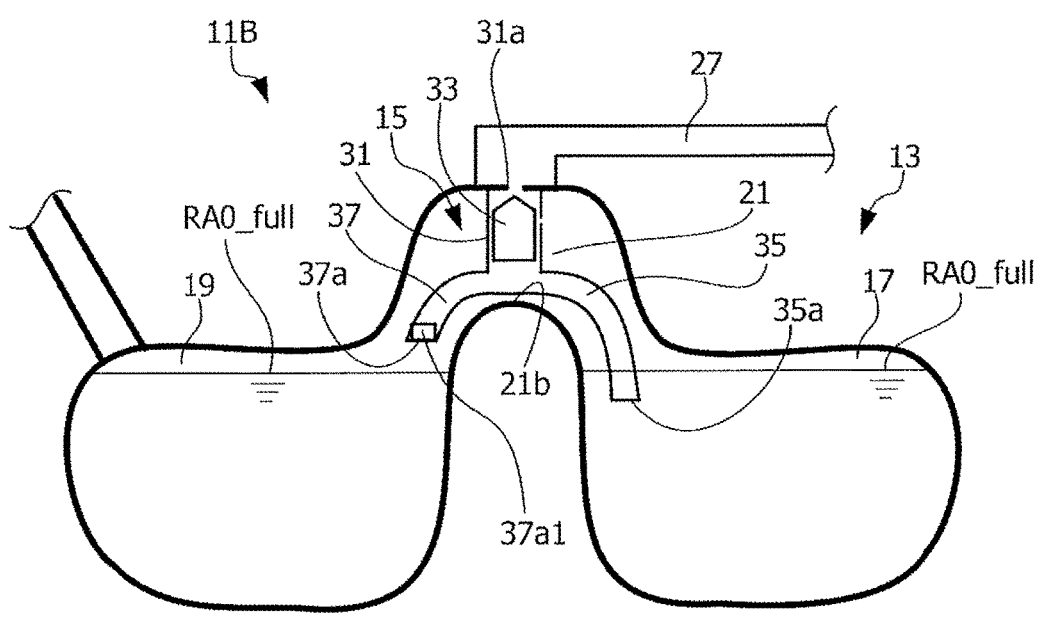

SADDLE TYPE FUEL TANK

CROSS REFERENCE TO RELATED APPLICATIONS

This application claims the foreign priority benefit under Title 35, United States Code, § 119 (a)-(d) of Japanese Patent Application No. 2016-238853, filed on Dec. 8, 2016, the disclosure of which is herein incorporated by reference in its entirety.

TECHNICAL FIELD

The present invention relates to a saddle type fuel tank for storing fuel to be supplied to an internal combustion engine mounted on a vehicle, in a chamber having a saddle-shaped portion between a main chamber and a subchamber.

BACKGROUND ART

For example, Patent Document 1 describes an invention of a saddle type fuel tank for storing fuel to be supplied to the internal combustion engine mounted on the vehicle, in the chamber having the saddle-shaped portion between the main chamber and the subchamber. In the vehicle in which on-board objects such as a propeller shaft and an exhaust pipe extending in a traveling direction of the vehicle are arranged across a tank body, the saddle type fuel tank is used as a measure for passing the on-board objects through the tank body without interfering with the tank body. The saddle type fuel tank according to Patent Document 1 is provided with a member called a fuel supply amount regulating valve (hereinafter referred to as a "full-tank regulating valve").

The full-tank regulating valve according to Patent Document 1 is located at the saddle-shaped portion in the chamber of the tank body and is provided in an exhaust passage communicating the tank body and a canister. The full-tank regulating valve has a float valve inside a substantially cylindrical valve body. The float valve has a function of opening and closing a communication port of the exhaust passage based on a magnitude of a first pressure difference $Pdif1$ ($Pdif1=|Pvalve-Ptank|$) between an internal pressure $Pvalve$ in the valve body and an internal pressure $Ptank$ in the tank body. An orifice for communicating the inside and outside of the valve body is provided close to the float valve in a side wall of the valve body.

In the saddle type fuel tank according to Patent Document 1, a substantially cylindrical hanging pipe offset toward a subchamber and extending obliquely downwardly is communicatively connected to a lower end of the substantially cylindrical valve body of the full-tank regulating valve. An opening of the hanging pipe is provided at a height corresponding to a full-tank liquid level.

The full-tank regulating valve according to Patent Document 1 configured as described above operates as follows. When a fuel liquid surface reaches the full-tank liquid level, that is, the opening of the hanging pipe during refueling of the tank body, the opening of the hanging pipe in the valve body is closed by the fuel liquid surface. As a result, the internal pressure $Pvalve$ in the valve body is isolated from the internal pressure $Ptank$ in the tank body. Assume that even after the fuel liquid surface reaches the full-tank liquid level, refueling continues.

Then, the internal pressure $Pvalve$ in the valve body becomes lower than the internal pressure $Ptank$ in the tank body, because the exhaust passage is open. The fuel runs up through the hanging pipe so as to reduce the first pressure difference $Pdif1$. Finally, the first pressure difference $Pdif1$ exceeds a predetermined internal pressure threshold value $Pth$ ($Pdif1>Pth$). In response to this, the float valve closes the exhaust passage.

Meanwhile, when the exhaust passage is closed, external air (internal air in the tank body) of the valve body flows into a chamber of the valve body through the orifice so as to reduce the first pressure difference $Pdif1$. This inflow causes the first pressure difference $Pdif1$ to converge to the internal pressure threshold value $Pth$ or less. Then, the float valve opens the exhaust passage.

In short, the full-tank regulating valve is configured to restrict a fuel supply amount by opening and closing the communication port of the exhaust passage based on the magnitude of the first pressure difference $Pdif1$ between the internal pressure $Pvalve$ in the valve body and the internal pressure $Ptank$ in the tank body.

CITATION LIST

Patent Literature

Patent Document 1: Japanese Patent Application Publication No. 2002-002314

SUMMARY OF INVENTION

Technical Problem

In the saddle type fuel tank according to Patent Document 1, there has been a possibility that liquid fuel reaches the canister through the exhaust passage immediately after full-tank refueling. This will be described. Immediately after the full-tank refueling, the fuel remains in the valve body in a liquid-tight state. When the external air (internal air in the tank body) of the valve body flows into the chamber of the valve body through the orifice, the float valve opens the exhaust passage. When a pressure $Pcani$ in the exhaust passage connected to the canister is lower than the internal pressure $Pvalve$ in the valve body, remaining fuel in the valve body is sucked out downstream (toward the exhaust passage connected to the canister) by action of a second pressure difference $Pdif2$ ($Pdif2=|Pvalve-Pcani|$). As a result, there has been a possibility that the liquid fuel reaches the canister through the exhaust passage immediately after the full-tank refueling.

The present invention has been made in view of the above circumstances, and an object of the present invention is to provide a saddle type fuel tank in which the liquid fuel does not reach the canister through the exhaust passage immediately after the full-tank refueling.

Solution to Problem

In order to achieve the above object, an aspect of the present invention is a saddle type fuel tank including: a saddle type tank body for storing fuel to be supplied to an internal combustion engine mounted on a vehicle, in a chamber having a saddle-shaped portion between a first chamber and a second chamber; and a full-tank regulating valve communicatively connected to an exhaust passage for discharging vaporized fuel generated in the tank body to a canister and provided at the saddle-shaped portion in the chamber of the tank body, wherein the full-tank regulating valve includes: a valve body; a float valve provided inside the valve body and operated to open or close a communication port of the exhaust passage based on a pressure difference between an internal pressure of the valve body and an internal pressure of the tank body; a first hanging pipe communicatively connected to the valve body and extending to hang down offset toward the first chamber, and having a first opening at a hanging end thereof; and a second hanging pipe communicatively connected to the valve body and extending to hang down offset toward the second chamber, and having a second opening at a hanging end thereof, and wherein the first opening of the first hanging pipe is located at a height corresponding to a full-tank liquid level in the first chamber, and the second opening of the second hanging pipe is located at a height lower than that corresponding to a full-tank liquid level in the second chamber.

Advantageous Effects of Invention

According to the present invention, it is possible to obtain a saddle type fuel tank in which liquid fuel does not reach the canister through the exhaust passage immediately after full-tank refueling.

BRIEF DESCRIPTION OF DRAWINGS

FIG. 2A is a diagram showing a state immediately after the saddle type fuel tank according to the first embodiment is filled up;

FIG. 2B is a diagram showing a state in which the saddle type fuel tank according to the first embodiment is inclined during full-tank;

FIG. 2C is a diagram showing a state in which the saddle type fuel tank according to the first embodiment returns to a horizontal state after it has been inclined during full-tank;

FIG. 4C is a diagram showing a state in which the saddle type fuel tank according to the second embodiment returns to a horizontal state after it has been inclined during full-tank.

DESCRIPTION OF EMBODIMENTS

Figure 1:
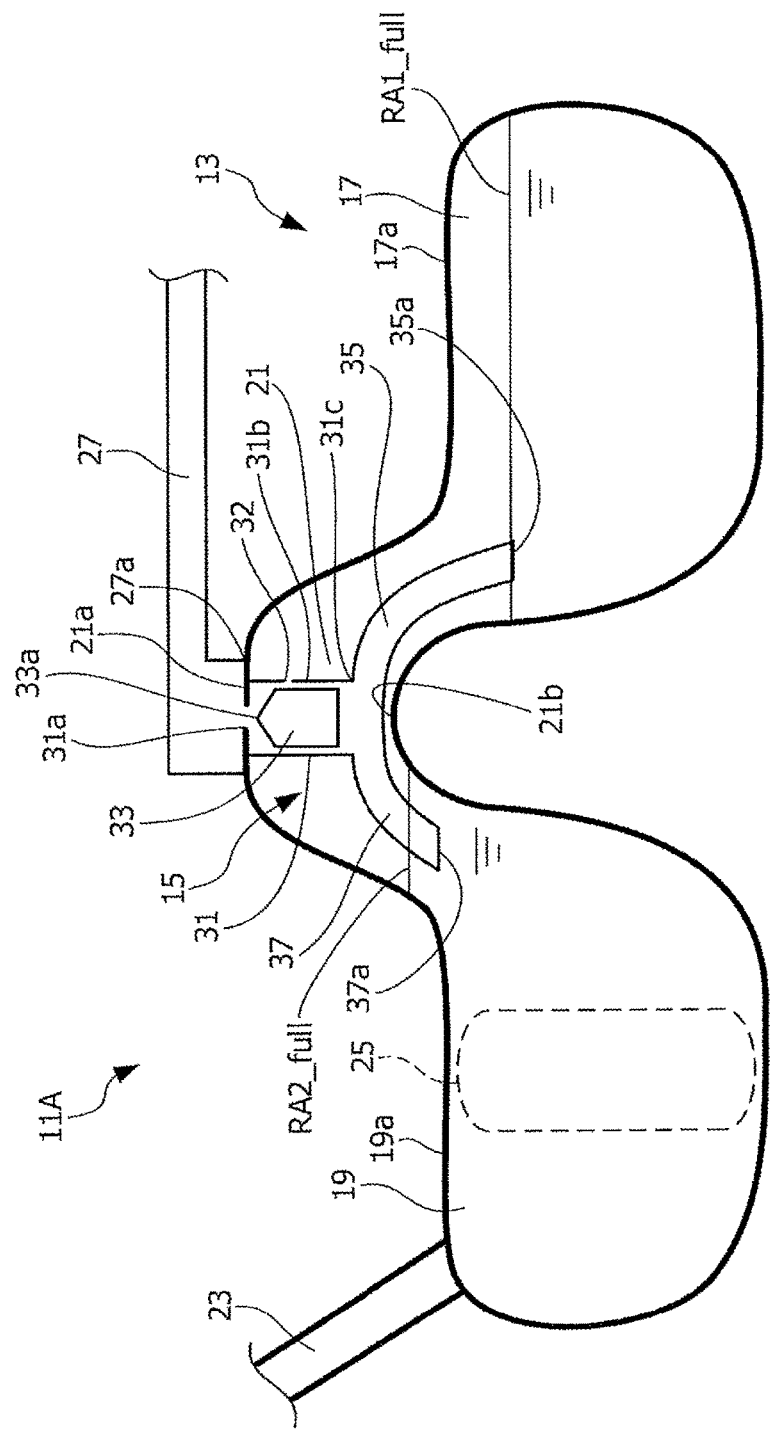
FIG. 1 is an overall configuration diagram of a saddle type fuel tank according to a first embodiment of the present invention.

Hereinafter, a saddle type fuel tank according to first and second embodiments of the present invention will be described in detail with reference to the drawings.

Overview of Saddle Type Fuel Tank 11A According to First Embodiment of the Present Invention First, an overview of a saddle type fuel tank 11A according to a first embodiment of the present invention will be described as an example in which the saddle type fuel tank 11A is applied to a hybrid vehicle (hereinafter referred to as a vehicle) having an engine (internal combustion engine: not shown) and an electric motor (not shown) as drive sources with reference to the drawings. In the following drawings, the same reference numerals are given to the same members or the corresponding members. Further, the size and shape of the member may be schematically shown by deformation or exaggeration for convenience of description.

FIG. 1 is an overall configuration diagram of the saddle type fuel tank 11A according to the first embodiment of the present invention. As shown in FIG. 1, the saddle type fuel tank 11A according to the first embodiment of the present invention includes a tank body 13 and a full-tank regulating valve 15.

The tank body 13 has a function of storing therein fuel such as gasoline to be supplied to the engine mounted in the vehicle. A chamber of the tank body 13 is configured to have a saddle-shaped portion 21 between a first chamber 17 and a second chamber 19. An upper wall 17a of the first chamber 17 and an upper wall 19a of the second chamber 19 are positioned at substantially the same height in a vertical direction. An upper wall 21a of the saddle-shaped portion 21 is positioned higher in the vertical direction than the upper wall 17a of the first chamber 17 and the upper wall 19a of the second chamber 19.

A fuel inlet pipe 23 having a fuel supply port (not shown) is communicatively connected to the second chamber 19 of the tank body 13. A fuel pump module 25 is provided inside the second chamber 19. The fuel pump module 25 has a function of pumping up the fuel stored in the second chamber 19 and sending out the fuel to an injector (not shown).

In the tank body 13, fuel vapor is generated by evaporation of the fuel stored therein. In order to discharge the fuel vapor generated in this way to a canister (not shown), the tank body 13 is provided with an evaporated fuel exhaust passage 27 which communicatively connects the chamber of the tank body 13 and the canister.

The full-tank regulating valve 15 is provided in the saddle-shaped portion 21 in the tank body 13. The full-tank regulating valve 15 is communicatively connected to a connecting portion 27a with the tank body 13 of the exhaust passage 27. This will be described in detail below.

The full-tank regulating valve 15 is configured to include a valve body 31, a float valve 33, a first hanging pipe 35 and a second hanging pipe 37.

The valve body 31 is formed in a substantially cylindrical shape. The valve body 31 is suspended and supported by the upper wall 21a of the saddle-shaped portion 21. The valve body 31 is provided with a substantially circular communication port 31a so as to face the connecting portion 27a of the exhaust passage 27. The communication port 31a of the valve body 31 is communicatively connected to the connecting portion 27a of the exhaust passage 27. An orifice 32 for communicating the inside and the outside of the valve body 31 is provided close to the float valve 33 in a side wall 31b of the valve body 31. The first hanging pipe 35 and the second hanging pipe 37 are provided in a substantially two-pronged shape at a lower end 31c of the valve body 31.

The float valve 33 is provided movable back and forth in the vertical direction inside the valve body 31. The float valve 33 has a valve body 33a at a position facing the communication port 31a. The float valve 33 opens and closes the communication port 31a by moving the valve body 33a along with the back and forth movement of the float valve 33 based on a magnitude of a first pressure difference Pdif1 (Pdif1=|Pvalve−Ptank|) between an internal pressure Pvalve in the valve body and an internal pressure Ptank in the tank body.

The first hanging pipe 35 is formed in a substantially cylindrical shape and is communicatively connected to the lower end 31c of the valve body 31. The first hanging pipe 35 extends to hang down offset toward the first chamber 17.

The first hanging pipe 35 has a first opening 35a at a hanging end thereof. The first opening 35a of the first hanging pipe 35 is located at a height corresponding to a full-tank liquid level RA1_full of the first chamber 17. The full tank liquid level RA1_full of the first chamber 17 is appropriately set in consideration of a full-tank liquid level RA0_full as an entire tank body 13. The first hanging pipe 35 has a function of closing the communication port 31a when the tank body 13 is filled up.

Similarly to the first hanging pipe 35, the second hanging pipe 37 is formed in a substantially cylindrical shape and is communicatively connected to the lower end 31c of the valve body 31. The second hanging pipe 37 extends to hang down offset toward the second chamber 19. The second hanging pipe 37 has a second opening 37a at a hanging end thereof. The second opening 37a of the second hanging pipe 37 is located at a position lower than that corresponding to a full-tank liquid level RA2_full of the second chamber 19. The full-tank liquid level RA2_full of the second chamber 19 is appropriately set in consideration of the maximum liquid level at which the fuel can be stored in the second chamber 19. The second hanging pipe 37 has a function of discharging at least fuel remaining in a liquid-tight state in the valve body 31 in cooperation with the first hanging pipe 35 immediately after the tank body 13 is filled up.

Operation of Saddle Type Fuel Tank 11A
According to First Embodiment of the Present Invention Next, operation of the saddle type fuel tank 11A according to the first embodiment of the present invention will be described with reference to FIGS. 2A to 2C. FIGS. 2A to 2C are diagrams for describing the operation of saddle type fuel tank 11A according to the first embodiment of the present invention. Among them, FIG. 2A is a diagram showing a state immediately after the saddle type fuel tank 11A according to the first embodiment is filled up. FIG. 2B is a diagram showing a state in which the saddle type fuel tank 11A according to the first embodiment is inclined during full-tank. FIG. 2C is a diagram showing a state in which the saddle type fuel tank 11A according to the first embodiment returns to a horizontal state after it has been inclined during full-tank.

Assume that the fuel is fed into the tank body 13 from the fuel supply port through the fuel inlet pipe 23 by a refueling gun (not shown). In the saddle type fuel tank 11A, the first chamber 17 and the second chamber 19 are separated from each other via the saddle-shaped portion 21. Further, the fuel inlet pipe 23 is provided only in the second chamber 19. In the saddle type fuel tank 11A configured as described above, when the second chamber 19 is filled with the fuel, the fuel flows over a bottom wall 21b (see FIG. 1) of the saddle-shaped portion 21 and flows into the first chamber 17.

When a liquid surface of the fuel flowing over the bottom wall 21b of the saddle-shaped portion 21 and flowing into the first chamber 17 from the second chamber 19 reaches the full-tank liquid level RA1_full in the first chamber 17, the liquid surface closes the first opening 35a of the first hanging pipe 35. As a result, the internal pressure Pvalve in the valve body 31 is isolated from the internal pressure Ptank in the tank body 13. Suppose that refueling continues even after the fuel liquid surface reached the full-tank liquid level RA1_full.

Then, the internal pressure Pvalve in the valve body 31 becomes lower than the internal pressure Ptank in the tank body 13. This is because the communication port 31a of the valve body 31 is open. Note that a pressure in the exhaust passage 27 is generally about the same as the atmospheric pressure. Then, the fuel runs up through the first hanging pipe 35 so as to reduce the first pressure difference Pdif1 (Pdif1=|Pvalve−Ptank|). Finally, the first pressure difference Pdif1 exceeds a predetermined internal pressure threshold value Pth (Pdif1>Pth). In response to this, the valve body 33a of the float valve 33 closes the communication port 31a connected to the exhaust passage 27.

When the communication port 31a is closed by the float valve 33, it is difficult for fuel vapor generated in the tank body 13 to escape. Then, it is regarded that the tank body 13 is full, and a refueling stop mechanism of the refueling gun is activated to stop the refueling.

As shown in FIG. 2A, immediately after the tank body 13 is filled up, both the first opening 35a of the first hanging pipe 35 and the second opening 37a of the second hanging pipe 37 are immersed in the fuel. Further, the fuel remains in a liquid-tight state in each of the valve body 31, the first hanging pipe 35 and the second hanging pipe 37. The fuel generally continues to remain in a liquid-tight state in the valve body 31 and the like, until at least one of the first opening 35a of the first hanging pipe 35 and the second opening 37a of the second hanging pipe 37 is separated from the fuel liquid surface.

During remaining of the fuel in a liquid-tight state at least in the valve body 31, when external air (internal air in the tank body 13) of the valve body 31 flows into a chamber of the valve body 31 through the orifice 32, there is a possibility that liquid fuel reaches the canister through the exhaust passage 27.

This will be explained. As described above, when the external air of the valve body 31 flows into the chamber of the valve body 31, the first pressure difference Pdif1 converges to the internal pressure threshold value Pth or less (Pdif1<Pth) and the float valve 33 opens the exhaust passage 27. At this time, when the pressure Pcani of the exhaust passage 27 connected to the canister is lower than the internal pressure Pvalve in the valve body 31, remaining fuel in the valve body 31 is sucked out downstream (toward the exhaust passage 27 connected to the canister) by action of a second pressure difference Pdif2 (Pdif2=|Pvalve−Pcani|). As a result, there has been a possibility that the liquid fuel reaches the canister through the exhaust passage 27 immediately after the full-tank refueling.

Therefore, the saddle type fuel tank 11A according to the first embodiment of the present invention is provided with, in addition to the first hanging pipe 35 having the function of closing the communication port 31a when the tank body 13 is filled up, the second hanging pipe 37 having a function of discharging at least the fuel remaining in a liquid-tight state in the valve body 31 in cooperation with the first hanging pipe 35 immediately after the tank body 13 is filled up.

In the saddle type fuel tank 11A according to the first embodiment of the present invention, in a state in which both the first opening 35a of the first hanging pipe 35 and the second opening 37a of the second hanging pipe 37 are immersed in the fuel (see FIG. 2A), when the vehicle is inclined in either of left and right roll directions (see FIG. 2B), either of the first opening 35a of the first hanging pipe 35 and the second opening 37a of the second hanging piping 37 can be separated from the fuel liquid surface.

In addition, after the vehicle is inclined in either of the left and right roll directions, when the vehicle returns to the horizontal state, the fuel flows over the bottom wall 21b of the saddle-shaped portion 21 to the first chamber 17 from the second chamber 19, so that heights of fuel liquid surfaces in the first chamber 17 and the second chamber 19 are substantially equal (see FIG. 2C), and the second opening 37a of the second hanging pipe 37 can be separated from the fuel liquid surface. Thus, it is possible to discharge at least the fuel remaining in a liquid-tight state in the valve body 31. As a result, it is possible to obtain the saddle type fuel tank 11A in which the liquid fuel does not reach the canister through the exhaust passage 27 immediately after the full-tank refueling.

Figure 3:
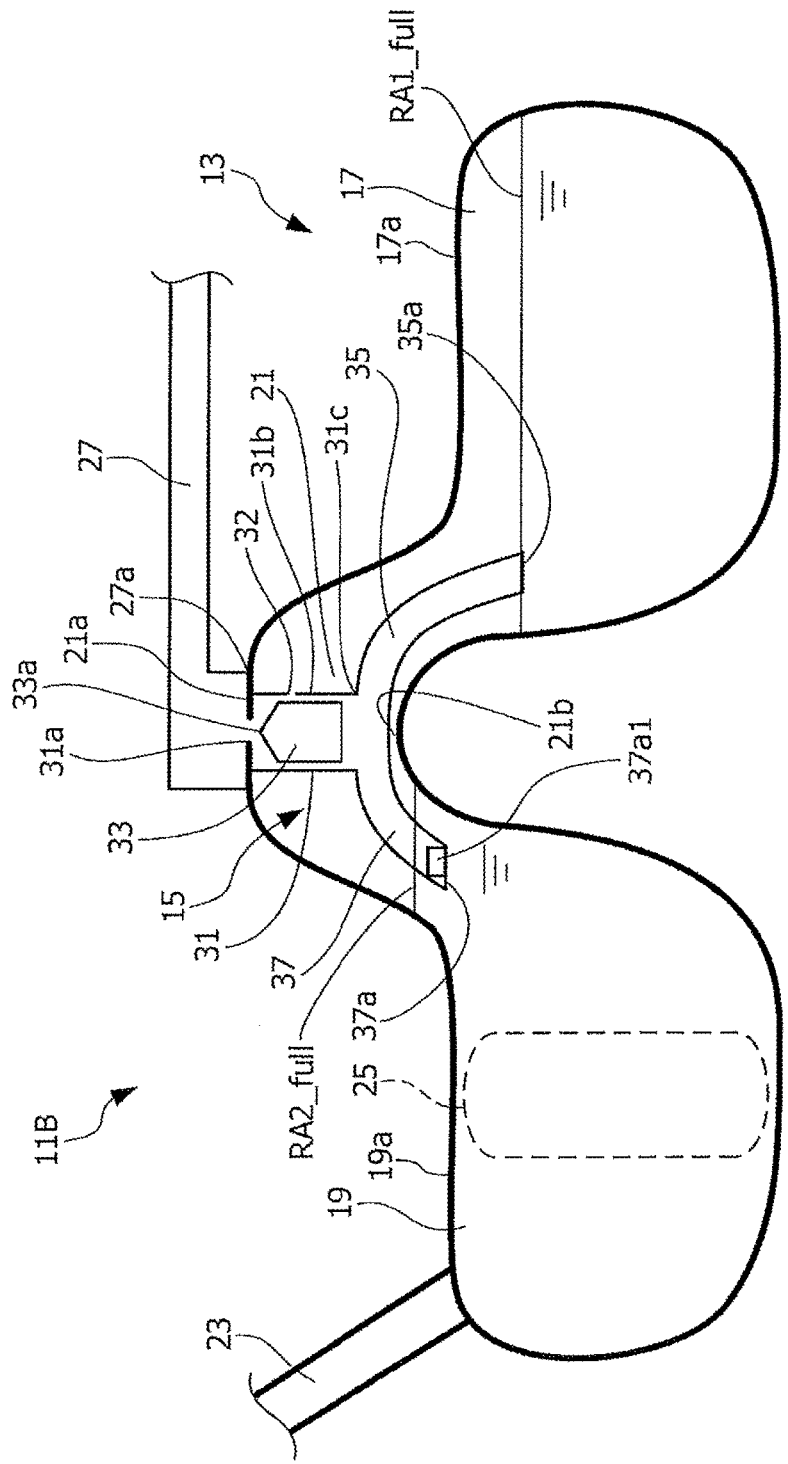
FIG. 3 is an overall configuration diagram of a saddle type fuel tank according to a second embodiment of the present invention.

Overview of Saddle Type Fuel Tank 11B According to Second Embodiment of the Present Invention Next, an overview of a saddle type fuel tank 11B according to a second embodiment of the present invention will be described as an example in which the saddle type fuel tank 11B is applied to the vehicle having the engine and the electric motor as the drive sources with reference to the drawings. FIG. 3 is an overall configuration diagram of the saddle type fuel tank 11B according to the second embodiment of the present invention. There are many members common to each other between the saddle type fuel tank 11B according to the second embodiment of the present invention and the saddle type fuel tank 11A according to the first embodiment of the present invention. Therefore, the same reference numerals are given to members common to the above-described two embodiments, and configuration of the saddle type fuel tank 11B according to the second embodiment will be described by focusing on differences between the two embodiments.

As shown in FIG. 3, the saddle type fuel tank 11B according to the second embodiment is different from the saddle type fuel tank 11A according to the first embodiment in that an on-off valve 37a1 for opening and closing the second opening 37a based on a height of the fuel liquid surface is provided at the second opening 37a of the second hanging pipe 37. Specifically, the on-off valve 37a1 closes the second opening 37a when the second opening 37a is in contact with the fuel, while it opens the second opening 37a when the second opening 37a is not in contact with the fuel 37a.

Figure 4A:
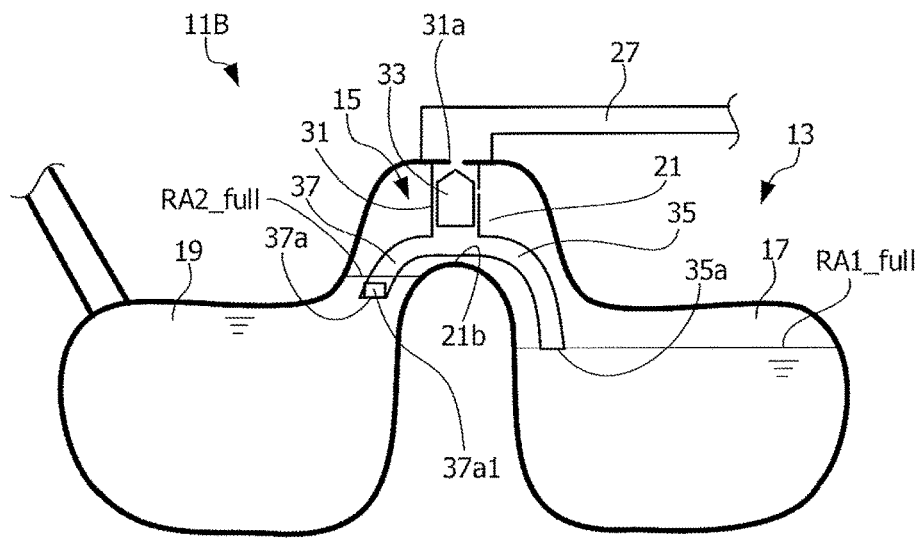
FIG. 4A is a diagram showing a state immediately after the saddle type fuel tank according to the second embodiment is filled up.
Figure 4B:
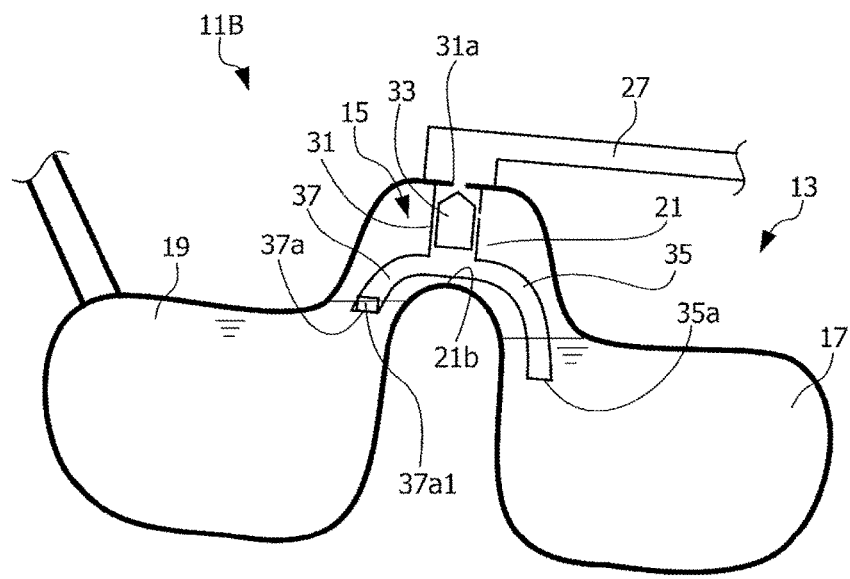
FIG. 4B is a diagram showing a state in which the saddle type fuel tank according to the second embodiment is inclined during full-tank.

Operation of Saddle Type Fuel Tank 11B According to Second Embodiment of the Present Invention Next, operation of the saddle type fuel tank 11B according to the second embodiment of the present invention will be described with reference to FIGS. 4A to 4C by focusing on differences with the operation of saddle type fuel tank 11A according to the first embodiment of the present invention. FIGS. 4A to 4C are diagrams for describing the operation of saddle type fuel tank 11B according to the second embodiment of the present invention. Among them, FIG. 4A is a diagram showing a state immediately after the saddle type fuel tank 11B according to the second embodiment is filled up. FIG. 4B is a diagram showing a state in which the saddle type fuel tank 11B according to the second embodiment is inclined during full-tank. FIG. 4C is a diagram showing a state in which the saddle type fuel tank 11B according to the second embodiment returns to a horizontal state after it has been inclined during full-tank.

The saddle type fuel tank 11B according to the second embodiment is provided with the on-off valve 37a1 for opening and closing the second opening 37a based on a height of the fuel liquid surface, at the second opening 37a of the second hanging pipe 37.

As shown in FIG. 4A, immediately after the tank body 13 is filled up, both the first opening 35a of the first hanging pipe 35 and the second opening 37a of the second hanging pipe 37 are immersed in the fuel. Therefore, the on-off valve 37a1 closes the second opening 37a. Further, similarly to the saddle type fuel tank 11A according to the first embodiment, the fuel remains in a liquid-tight state in each of the valve body 31, the first hanging pipe 35 and the second hanging pipe 37. Similarly to the saddle type fuel tank 11A according to the first embodiment, the fuel generally continues to remain in a liquid-tight state in the valve body 31 and the like, until at least one of the first opening 35a of the first hanging pipe 35 and the second opening 37a of the second hanging pipe 37 is separated from the fuel liquid surface.

In the saddle type fuel tank 11B according to the second embodiment of the present invention, in a state in which both the first opening 35a of the first hanging pipe 35 and the second opening 37a of the second hanging pipe 37 are immersed in the fuel (see FIG. 4A), when the vehicle is inclined in a right (the first chamber 17 side) roll direction for example due to left turn (see FIG. 4B), the second opening 37a of the second hanging piping 37 can be separated from the fuel liquid surface. At this time, the on-off valve 37a1 opens the second opening 37a. However, in an initial stage (the second opening 37a of the second hanging pipe 37 is still in contact with the liquid fuel) in which the vehicle gradually inclines in the right roll direction from the horizontal state, the on-off valve 37a1 closes the second opening 37a. Therefore, in the initial stage in which the vehicle gradually inclines in the right roll direction from the horizontal state, it is possible to prevent the fuel from moving to the first chamber 17 from the second chamber 19 sequentially through the second hanging pipe 37, the valve body 31 and the first hanging pipe 35.

After the vehicle is inclined in either of the left and right roll directions, when the vehicle returns to the horizontal state, the fuel flows over the bottom wall 21b of the saddle-shaped portion 21 to the first chamber 17 from the second chamber 19, so that heights of fuel liquid surfaces in the first chamber 17 and the second chamber 19 are substantially equal (see FIG. 4C), and similarly to the saddle type fuel tank 11A according to the first embodiment, the second opening 37a of the second hanging pipe 37 can be separated from the fuel liquid surface. Thus, it is possible to discharge at least the fuel remaining in a liquid-tight state in the valve body 31. As a result, similarly to the saddle type fuel tank 11A according to the first embodiment, it is possible to obtain the saddle type fuel tank 11B in which the liquid fuel does not reach the canister through the exhaust passage 27 immediately after the full-tank refueling.

Operational Effect of Saddle Type Fuel Tank 11A According to First Embodiment of the Present Invention Next, operational effect of the saddle type fuel tank 11A according to the first embodiment of the present invention will be described. The saddle type fuel tank 11A (corresponding to claim 1) according to the first embodiment of the present invention includes the saddle type tank body 13 for storing fuel to be supplied to the engine (internal combustion engine) mounted on the vehicle, in the chamber having the saddle-shaped portion 21 between the first chamber 17 and the second chamber 19, and the full-tank regulating valve 15 communicatively connected to an exhaust passage 27 for discharging vaporized fuel generated in the tank body 13 to the canister and provided at the saddle-shaped portion 21 in the chamber of the tank body 13. The full-tank regulating valve 15 includes the valve body 31, the float valve 33 provided inside the valve body 31 and operated to open or close the communication port 31a of the exhaust passage 27 based on the first pressure difference Pdif1 (Pdif1=|Pvalve−Ptank|) between the internal pressure Pvalve of the valve body 31 and the internal pressure Ptank of the tank body 13, the first hanging pipe 35 communicatively connected to the valve body 31 and extending to hang down offset toward the first chamber 17, and having the first opening 35a at the hanging end thereof, and the second hanging pipe 37 communicatively connected to the valve body 31 and extending to hang down offset toward the second chamber 19, and having the second opening 37a at the hanging end thereof. The first opening 35a of the first hanging pipe 35 is located at the height corresponding to the full-tank liquid level RA1_full in the first chamber 17. The second opening 37a of the second hanging pipe 37 is located at the height lower than that corresponding to the full-tank liquid level RA2_full in the second chamber 19.

As shown in FIG. 2A, in the saddle type fuel tank 11A according to the first embodiment, immediately after the tank body 13 is filled up, both the first opening 35a of the first hanging pipe 35 and the second opening 37a of the second hanging pipe 37 are immersed in the fuel. Further, the fuel remains in a liquid-tight state in each of the valve body 31, the first hanging pipe 35 and the second hanging pipe 37. The fuel generally continues to remain in a liquid-tight state in the valve body 31 and the like, until at least one of the first opening 35a of the first hanging pipe 35 and the second opening 37a of the second hanging pipe 37 is separated from the fuel liquid surface.

Therefore, the saddle type fuel tank 11A according to the first embodiment is provided with, in addition to the first hanging pipe 35 having the function of closing the communication port 31a when the tank body 13 is filled up, the second hanging pipe 37 having the function of discharging at least the fuel remaining in a liquid-tight state in the valve body 31 in cooperation with the first hanging pipe 35 immediately after the tank body 13 is filled up.

With the saddle type fuel tank 11A according to the first embodiment, it is possible to discharge at least the fuel remaining in a liquid-tight state in the valve body 31 by cooperation of the first hanging pipe 35 and the second hanging pipe 37, and thus it is possible to obtain the saddle type fuel tank 11A in which the liquid fuel does not reach the canister through the exhaust passage 27 immediately after the full-tank refueling.

The saddle type fuel tank 11A according to the first embodiment may be configured such that the valve body 31 of the full-tank regulating valve 15 is formed in a substantially cylindrical shape and is provided in the tank body 13 so that an axial direction thereof is oriented substantially vertically, and the first hanging pipe 35 and the second hanging pipe 37 are provided in a substantially two-pronged shape toward the lower end of the valve body 31.

Operational Effect of Saddle Type Fuel Tank 11B According to Second Embodiment of the Present Invention Next, operational effect of the saddle type fuel tank 11B according to the second embodiment of the present invention will be described. The saddle type fuel tank 11B according to the second embodiment of the present invention may be configured such that the second opening 37a of the second hanging pipe 37 is provided with the on-off valve 37a1 for opening and closing the second opening 37a based on the height of the fuel liquid surface.

In the saddle type fuel tank 11B according to the second embodiment, the second opening 37a of the second hanging pipe 37 is provided with the on-off valve 37a1 for opening and closing the second opening 37a based on the height of the fuel liquid surface, and thus, in addition to the operational effect of the saddle type fuel tank 11A according to the first embodiment, in an initial stage (the second opening 37a of the second hanging pipe 37 is still in contact with the liquid fuel) in which the vehicle gradually inclines in the roll direction toward the first chamber 17 from the horizontal state, it is possible to prevent the fuel from moving to the first chamber 17 from the second chamber 19 sequentially through the second hanging pipe 37, the valve body 31 and the first hanging pipe 35.

Other Embodiments

Embodiments described above are examples of implementation of the present invention. Therefore, a technical scope of the present invention should not be interpreted to be limited by these. This is because the present invention can be implemented in various forms without departing from the spirit and scope thereof.

REFERENCE SIGNS LIST

11A: saddle type fuel tank according to first embodiment
11B: saddle type fuel tank according to second embodiment
13: tank body
15: full-tank regulating valve
17: first chamber
19: second chamber
27: exhaust passage
31: valve body
31a: communication port of valve body
33: float valve
35: first hanging pipe
35a: first opening
37: second hanging pipe
37a: second opening
37a1: on-off valve

The invention claimed is:
1. A saddle type fuel tank comprising:
a saddle type tank body for storing fuel to be supplied to an internal combustion engine mounted on a vehicle, in a chamber having a saddle-shaped portion between a first chamber and a second chamber; and
a full-tank regulating valve communicatively connected to an exhaust passage for discharging vaporized fuel generated in the tank body to a canister and provided at the saddle-shaped portion in the chamber of the tank body, wherein the full-tank regulating valve comprises:
a valve body;
a float valve provided inside the valve body and operated to open or close a communication port of the exhaust passage based on a pressure difference between an internal pressure of the valve body and an internal pressure of the tank body;
a first hanging pipe communicatively connected to the valve body and extending to hang down offset toward the first chamber, and having a first opening at a hanging end thereof; and a second hanging pipe communicatively connected to the valve body and extending to hang down offset toward the second chamber, and having a second opening at a hanging end thereof, and wherein the first opening of the first hanging pipe is located at a height corresponding to a full-tank liquid level in the first chamber, and the second opening of the second hanging pipe is located at a height lower than that corresponding to a full-tank liquid level in the second chamber and is provided with an on-off valve for opening and closing the second opening based on a height of a fuel liquid surface.

2. The saddle type fuel tank according to claim 1, wherein the valve body of the full-tank regulating valve is formed in a substantially cylindrical shape and is provided in the tank body so that an axial direction thereof is oriented substantially vertically, and the first hanging pipe and the second hanging pipe are provided in a substantially two-pronged shape toward a lower end of the valve body.

\* \* \* \* \*